(No Model.) 7 Sheets—Sheet 1.

H. C. CARVER.
APPARATUS FOR EXTINGUISHING FIRES.

No. 447,601. Patented Mar. 3, 1891.

Fig 1.

Witnesses
S. H. Cann
M. Carver

Inventor
H. C. Carver
O. E. Duffy atty,

THE NORRIS PETERS CO., PHOTO-LITHO., WASHINGTON, D. C.

(No Model.) 7 Sheets—Sheet 2.

H. C. CARVER.
APPARATUS FOR EXTINGUISHING FIRES.

No. 447,601. Patented Mar. 3, 1891.

(No Model.) 7 Sheets—Sheet 3.
H. C. CARVER.
APPARATUS FOR EXTINGUISHING FIRES.

No. 447,601. Patented Mar. 3, 1891.

(No Model.) 7 Sheets—Sheet 4.

H. C. CARVER.
APPARATUS FOR EXTINGUISHING FIRES.

No. 447,601. Patented Mar. 3, 1891.

Fig. 4.

(No Model.) 7 Sheets—Sheet 5.
H. C. CARVER.
APPARATUS FOR EXTINGUISHING FIRES.

No. 447,601. Patented Mar. 3, 1891.

(No Model.) 7 Sheets—Sheet 6.
H. C. CARVER.
APPARATUS FOR EXTINGUISHING FIRES.

No. 447,601. Patented Mar. 3, 1891.

Fig. 6.

UNITED STATES PATENT OFFICE.

HENRY CLIFTON CARVER, OF MANCHESTER, ENGLAND.

APPARATUS FOR EXTINGUISHING FIRES.

SPECIFICATION forming part of Letters Patent No. 447,601, dated March 3, 1891.

Application filed August 7, 1888. Serial No. 282,134. (No model.) Patented in England September 5, 1887, No. 12,010; in Germany July 25, 1888, No. 46,637; in France July 27, 1888, No. 192,065; in Belgium July 27, 1888, No. 82,707, and in Italy September 30, 1888, XLVII, 186.

*To all whom it may concern:*

Be it known that I, HENRY CLIFTON CARVER, a subject of the Queen of Great Britain and Ireland, residing at Cross Street, Manchester, in the county of Lancaster, Kingdom of Great Britain and Ireland, have invented Improvements in Apparatus for Extinguishing Fires, (for which patents have been obtained in England, No. 12,010, dated September 5, 1887; in Germany July 25, 1888, No. 46,637; in France July 27, 1888, No. 192,065; in Belgium July 27, 1888, No. 82,707, and in Italy September 30, 1888, XLVII, 186,) of which the following is a specification.

My invention has reference to means or apparatus for utilizing waste gaseous products of combustion from marine steam-boiler furnaces for the purpose of extinguishing fires on board steamships. It has before been proposed to employ for extinguishing fire gaseous products of combustion obtained by various methods. In 1844 an English patent, No. 10,212, was taken out, in the specification of which there was described an apparatus mounted on wheels in which gases were to be generated in a fire-place in which coke or other fuel was to be thrown into a state of rapid combustion by a current of air produced by means of a fan or blower made to revolve with great rapidity; and these gases were to be applied for extinguishing fire. More recently another arrangement has been proposed for deoxygenating air wherewith to extinguish fire by drawing into a steam-boiler furnace fitted with an arrangement of pipes and inlets for the purpose, a mixture of air and finely-powdered carbonaceous materials by means of a fan. Another arrangement that has been proposed consists of an apparatus mounted on wheels and comprising a boiler in which a fire is to be burned for the purpose of vitiating air and of producing a supply of steam at low-pressure which may or may not be mixed with the vitiated air. This apparatus comprises also a high-pressure boiler supplying steam to an engine that is to drive a fan for drawing the products of combustion from both boilers for extinguishing fire.

The above-mentioned and other kindred proposals are based upon the production of the gases for extinguishing fire with the aid of special apparatus or of furnaces fitted with special appliances, or by the combustion of particular kinds or preparations of fuel for the purpose. Now the employment of these special means for producing fire-extinguishing gas would in very many cases be attended by such serious disadvantages as greatly to limit their practical utility and applicability. It has also been proposed to force the gaseous products of combustion from the furnaces of steam-boilers used for ordinary purposes and employ these products for extinguishing fires, the said products being forced through an outlet-pipe by a steam-jet located in the furnace-flue; but no provision has been made for cutting off the communication between the said flue and outlet-pipe; consequently the apparatus would be liable to become choked and inoperative when wanted for use.

The object of my present invention is to obviate all such disadvantages, for which purpose, instead of employing gases produced by special means, as referred to above, I utilize, in case of fire, the gaseous products of combustion (which ordinarily flow to waste) resulting from the firing of marine steam-boiler furnaces, in the manner and with the fuel customary for each furnace, respectively, when performing its ordinary functions, without the aid of any special combustible or of any chemical ingredient; and I use a steam-jet blower for diverting the gaseous products from their ordinary course and forcing them where required, a valve located between the boiler smoke-box or furnace and the blower being employed for controlling the communication between these parts. When using these gaseous products for the purposes of this invention, I sometimes employ means for reducing their temperature and for cleansing them from some of the gaseous matter of which they are partly composed, and of the solid matter which they may hold in suspension.

My invention further consists in certain combinations and arrangements of parts hereinafter fully described, and specifically indicated in the claims.

In carrying out my invention I provide in connection with the said furnaces apparatus such as I will now describe with reference to the accompanying drawings.

Fig. 3 illustrates a modification, and Figs. 4 to 7 detail views, hereinafter described.

Figure 1:
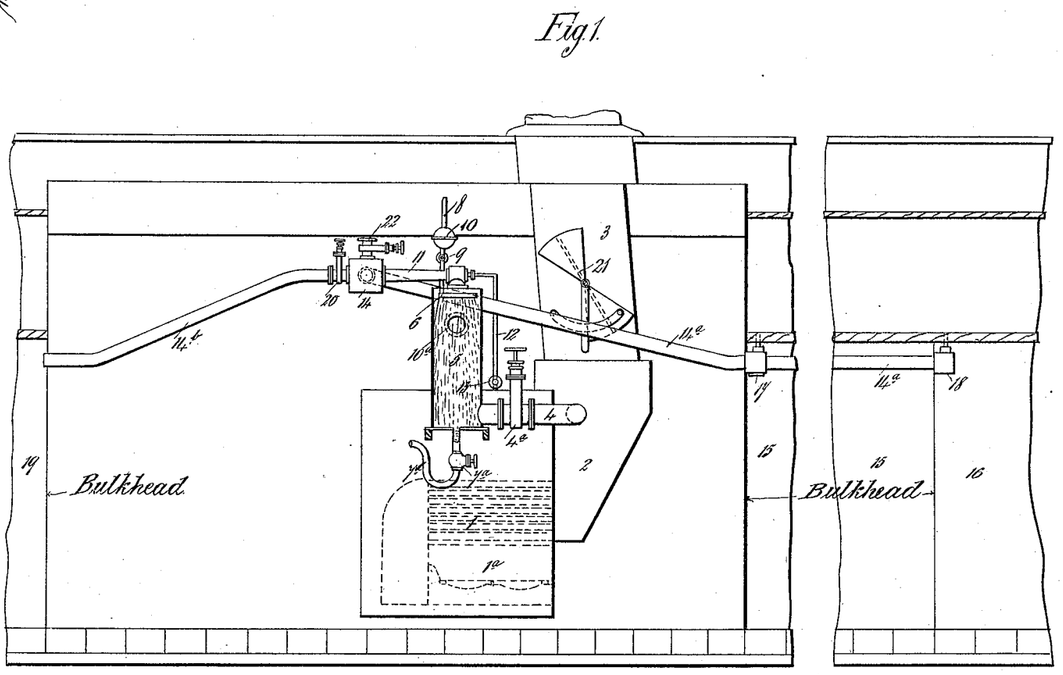
Figure 1 is a longitudinal section, and Fig. 2 a plan view, showing the application of the apparatus to a steam-vessel, the engines for propelling which are supplied with steam by one boiler.
Figure 2:
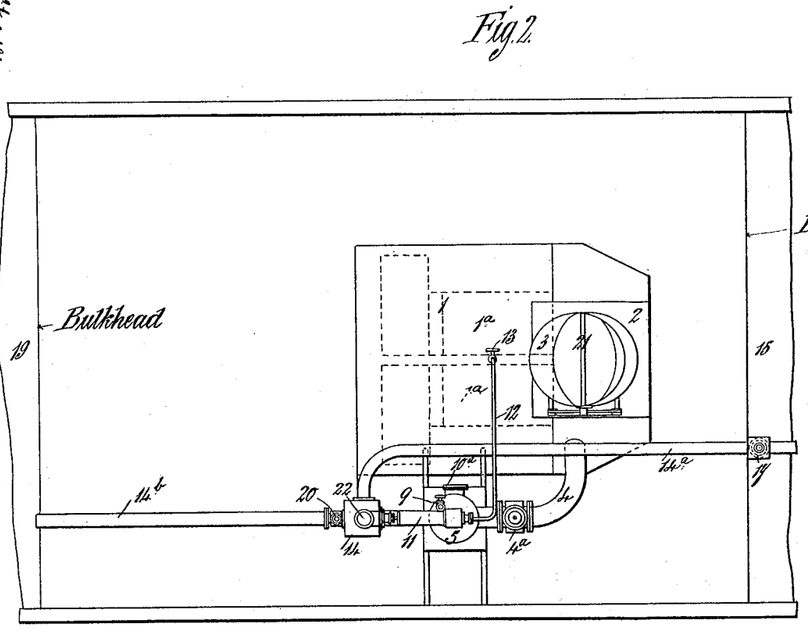

In Figs. 1 and 2, 1 is a marine-boiler, $1^a$ $1^a$ the boiler-furnaces, 2 the smoke-box, which receives the waste gaseous products of combustion from the furnaces, and 3 the uptake leading from the smoke-box and through which the gaseous products ordinarily pass away into the air as waste.

4 is a pipe fitted with a valve $4^a$, and leading from the smoke-box to the bottom of a washing apparatus, consisting of a chamber 5, (shown in section,) water-shower rose 6, placed near the top of the chamber, and waste-water-outlet pipe 7, having a valve $7^a$, and forming a siphon, as shown, which may discharge overboard or into the bilges.

8 is a water-supply pipe fitted with a valve 9, for conveying water to the rose 6 from any convenient source in order to produce a water-shower in the chamber 5.

10 is a strainer, Fig. 1, for keeping back any solid particles which might obstruct the perforations in the rose, and $10^a$ is a door to a passage between the interior of the chamber 5 and the outer air. There is an annular space between the rose 6 and the chamber 5, and the rose has a number of passages through it (which are not seen in the drawings) for the waste gaseous products to pass through.

11 is a steam-jet blower fixed on the top of the chamber 5 and supplied with steam from the boiler 1, through the valve 13 and pipe 12.

14 is a receiver, into which the waste gaseous products are forced by the blower, and having three outlets through which they may be delivered therefrom.

$14^a$ $14^b$ are two fixed delivery-pipes running fore and aft from the receiver. The pipe $14^a$ leads to the holds 15 16 of the steamship through the valves 17 18, respectively, and the pipe $14^b$ leads to the hold 19, through the valve 20. The valves 17 18 discharge downward, and there is a free way through 17 into the pipe leading to 18. The spindles for operating the valves can be worked from the deck, as indicated. When only one outlet is required for the waste gaseous products the receiver 14 and the delivery-valves may be omitted, the delivery-pipe being then connected directly to the blower.

22 is a valve on the receiver, to which a flexible delivery-pipe may be connected.

21 is a damper in the uptake 3, which can be regulated or closed for the purpose of preventing a back-draft past it when the apparatus is at work. When the fire to be extinguished is accessible with the flexible delivery-pipe, it may be put out by discharging the waste gaseous products directly upon it through the pipe; but when the fire takes place in a hold and is not thus accessible it is necessary to pervade the whole atmosphere of the hold with the waste gaseous products. In either case the waste gaseous products envelop the fire and cause it to die out, owing to their inability to support its combustion.

The operation of the apparatus is as follows: The valve 22 or one of the valves 17 18 20 is opened (according to the locality of the fire) and the valves $4^a$, $7^a$, 9, and 13 are also opened. The opening of the steam-valve 13 puts the blower into action, so that it draws into itself part or all (as the case may be) of the waste gaseous products emitted from the boiler-furnaces (the damper 21 being regulated, or, if necessary, closed, so as to prevent back-draft past the damper,) through the pipe 4, then upward through the chamber 5, past the rose 6, by the passages both round it and through it, so that they are thoroughly intermingled with the water shower, and then forces them into the receiver 14 and through the delivery-pipe corresponding to the valve, which has been opened for giving them egress to act on the fire. The water shower cools the waste gaseous products and cleanses them from some of the smoke and other solid matter which they may hold in suspension and from some of the soluble gaseous matter of which they may be partly composed, such as sulphurous acid and ammoniacal gas, &c. This cooling and cleansing process renders the waste gaseous products less injurious to certain kinds of cargo and objects. The waste water from the washing apparatus passes away through the pipe 7 and forms a seal in the siphon, which prevents air from being drawn in through the pipe when the apparatus is at work. Should it not be required to cool or cleanse the waste gaseous products, the water-supply valve 9 and waste-water valve $7^a$ are kept closed. Sometimes the waste gaseous products may be passed through the washing apparatus after (instead of before) going through the blower. In this case, however, the blower must be made comparatively greater, in order to compensate for the larger volume occupied by the waste gaseous products when passed through the blower in their heated condition, and the airway and door may be applied to the suction-pipe between the valve $4^a$ and the blower. It is important that the blower should be powerful enough to deliver the waste gaseous products into the holds which are being operated on in sufficiently large volume to maintain an outward flow through all places of escape which there may be from the holds, and thus to prevent the admission of fresh air to the holds. Such places of escape should in the aggregate be large enough to admit of the original atmosphere of the holds being freely expelled through them by the inflowing waste gaseous products, and when any places of escape are provided specially to facilitate this expulsion they should be situated remotely from the inflowing stream. After a fire has been extinguished in one of the holds by pervading its whole atmosphere with the waste gaseous products, the valve $4^a$ may be closed and the door $10^a$ opened, whereupon the blower will draw in fresh air through the airway and force it into the hold, so as to expel the waste gaseous products therefrom. When the apparatus is blowing fresh air, the water-valve 9 may be closed and the damper 21 be restored to its normal position. Sometimes when there are two or more contiguous holds a delivery-pipe may be led to one only of them, and the waste gaseous products may be allowed to fill this hold and to overflow into and fill the other or others, also through an opening or openings in the intermediate bulk-head or bulk-heads. Sometimes when it is not required to cool or cleanse the waste gaseous products, the washing apparatus may be dispensed with and the airway and door $10^a$ may be applied on the suction-pipe 4, as already described, and sometimes they may be so applied when the washing apparatus is situated as shown in the drawings.

Figure 3:
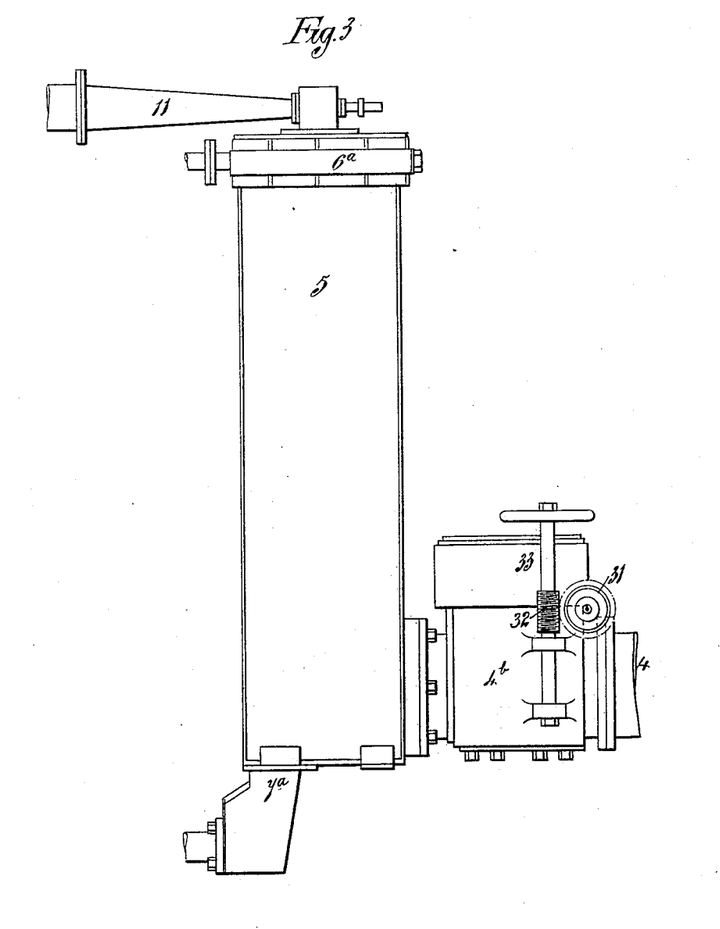

Fig. 3 illustrates in elevation a modification, wherein the valve $4^b$ is a two-way valve that serves the double purpose of the valve $4^a$ and airway and door $10^a$. (Shown in Figs. 1 and 2.) $6^a$ is a combined water rose and strainer, and $7^a$ is a water-trap. In other respects the construction and operation of this modified arrangement are similar to that hereinbefore described.

Figure 4:
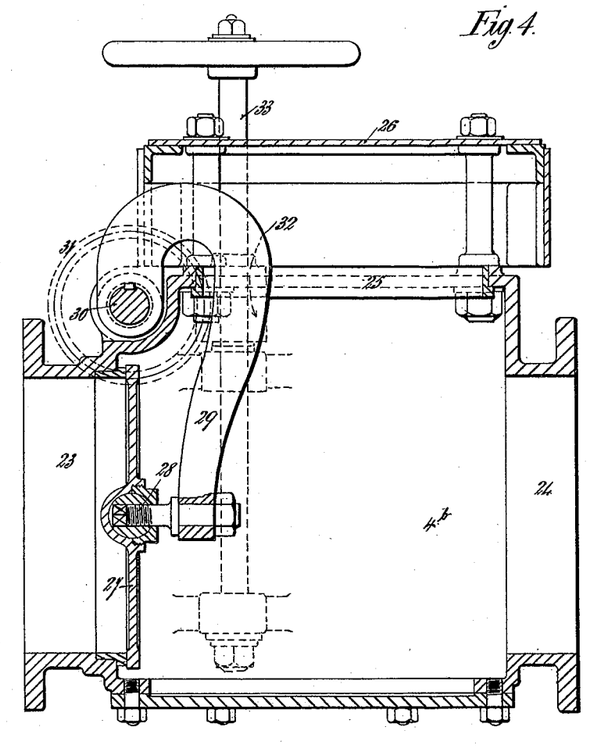

Fig. 4 is a vertical section of the two-way valve $4^b$.

Figure 5:
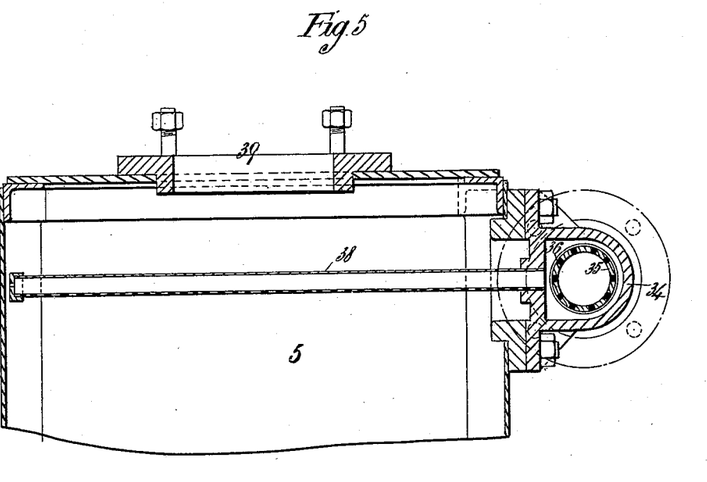
Figure 6:
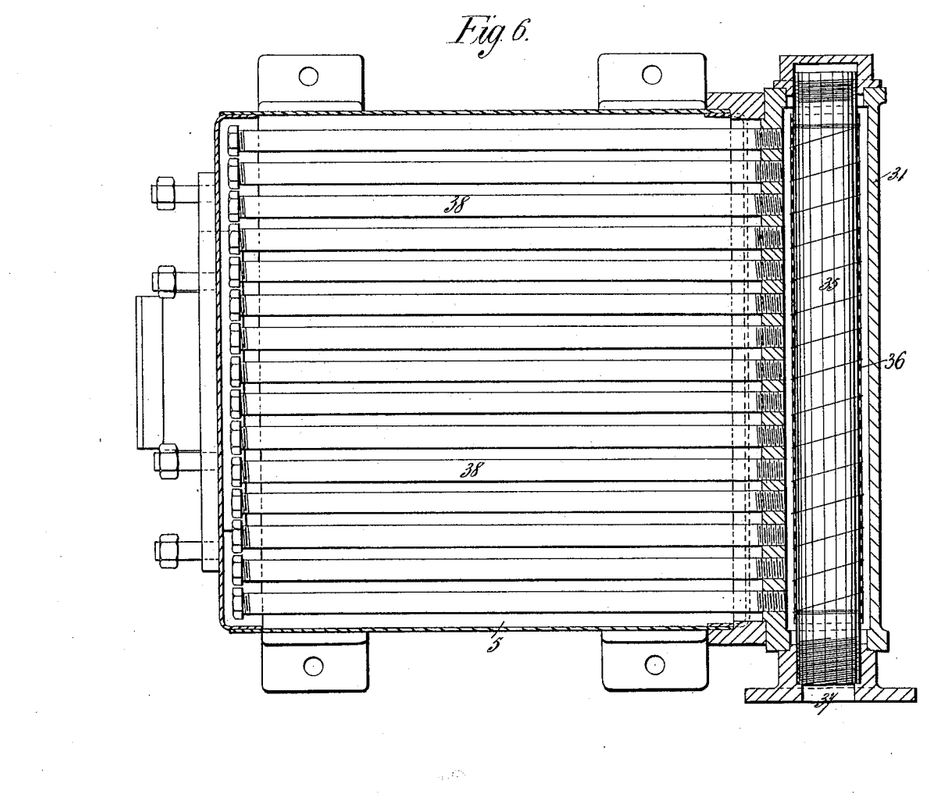
Figure 7:
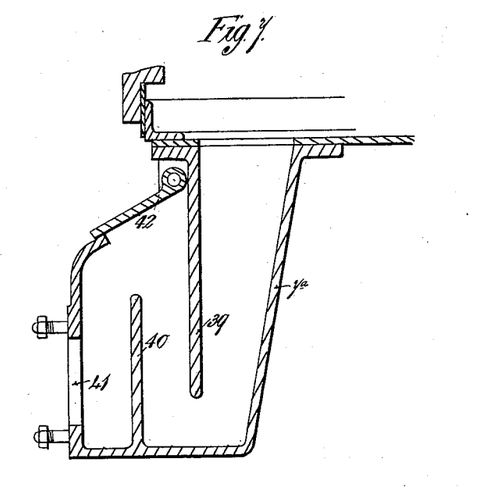

Figs. 5 and 6 are respectively a vertical section and sectional plan of the upper part of the chamber 5, with the combined water rose or distributer and strainer applied thereto, and Fig. 7 a vertical section of the water-trap $7^a$.

Figs. 4, 5, 6, and 7 are drawn to a larger scale than Figs. 1, 2, and 3, and Fig. 3 to a larger scale than Figs. 1 and 2.

In Fig. 4 the valve-case is formed with three openings 23, 24, and 25, of which 23 communicates with the smoke-box of the boiler, 24 with the interior of the chamber 5, and 25 with the atmosphere. The latter opening is protected by a cover or guard 26. 27 is a disk-valve connected by a ball-and-socket joint 28 to one end of a bent lever 29, the other end of which is fixed to a shaft 30, on which is fixed a worm-wheel 31. 32 is a worm fixed on the hand-wheel shaft 33 and gearing with the worm-wheel 31. In the position shown the valve 27 closes the opening 23 and permits air to pass through the openings 24 and 25 to the chamber 5. By rotating the shaft 30 through a quarter of a revolution the valve 27 will be caused to close the opening 25 and place the chamber 5 in communication with the smoke-box by the openings 23 and 24.

In Figs. 5 and 6, 34 is a casting, within which is secured a perforated tube 35, surrounded with a layer of wire-gauze 36, that is secured in place in any suitable manner, as, for instance by wire wound over it spirally, as shown. 37 is the water-inlet. 38 38 are a number of water-distributing tubes, each perforated in its under surface and provided at its free end with a perforated cap. These tubes are secured at their other ends to the casting 34, with the interior of which they are in communication to receive their water-supply. They are arranged to project across the top portion of the chamber 5, and are placed a short distance apart to admit of the passage of the products of combustion to the outlet-opening 39 at the top of the chamber.

In Fig. 7 the water-trap $7^a$ comprises a casing with internal downwardly and upwardly projecting flanges 39 and 40, respectively, free outlet 41, and outlet 42, having a hinged cover. The construction of the trap is such as to admit of a depth of water being always maintained therein sufficient to prevent the admission of air to the chamber 5 during the operation of the apparatus.

Figure 8:
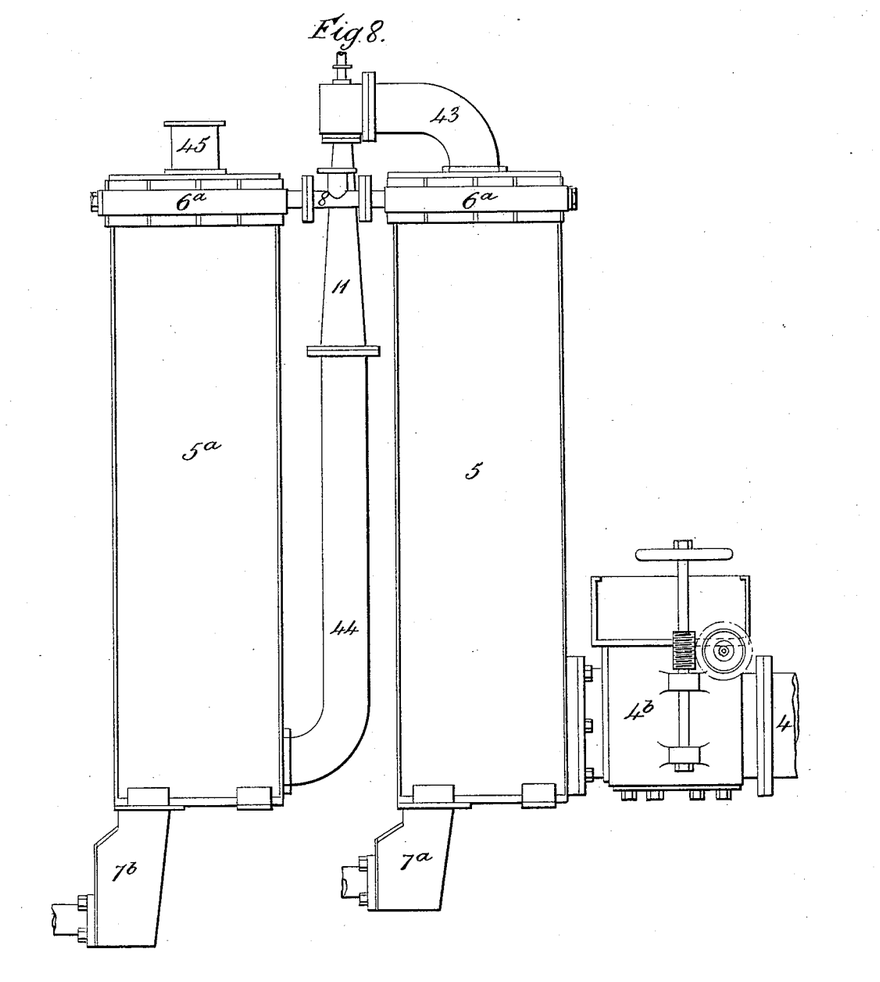
Fig. 8 is a vertical section illustrating another modification.

Fig. 8 is a vertical elevation illustrating another alternative modification. In this arrangement 5 $5^a$ are two washing-chambers, each similar to the one shown in Fig. 3. The steam-jet blower 11 is fixed so that its suction-inlet is in communication with the upper part of the chamber 5 through a bend-pipe 43, and that its discharge-outlet is in communication with the bottom part of the chamber $5^a$ through a bend-pipe 44. A valve $4^b$ like that shown in Fig. 4 is attached to the chamber 5. 45 is an outlet from the top of the chamber $5^a$. When the apparatus is in use for fire-extinguishing, the waste gaseous products are drawn by the blower through the chamber 5 past the valve $4^b$ and forced into chamber $5^a$ intermingled with the steam used in the blower. The object of the second washing-chamber $5^a$ is to continue the cooling and purifying process after the waste gaseous products have become intermingled with the steam used in the blower and to separate all or part of the watery vapors resulting from the condensation of the steam. Owing to the pressure in the chamber $5^a$ being greater than the suction in 5 a deeper water-seal is required for trapping the former than is necessary for the latter, and the trap $7^b$ on the chamber $5^a$ is therefore made deeper than the trap $7^a$.

When the volume of waste gaseous products emitted from the boiler-furnaces is so great that the withdrawal of a portion of them for fire-extinguishing purposes produces no appreciable back-draft, the damper 21 may sometimes be omitted. This case will occur most commonly when the furnaces of a range of boilers all discharge into a common outlet-passage; but even then it may be desirable in some instances to arrange by means of a damper that the waste gaseous products availed of for fire-extinguishing purposes shall be withdrawn from one or some only of the furnaces. The delivery-pipes may be laid along any convenient course, and should there be dips in them where water might accumulate either from the steam employed in working the apparatus or otherwise siphons for the escape of the water may be connected to the pipes at the point where it accumulates.

When forced draft is employed for working the boiler-furnaces the action of this draft may sometimes be availed of for forcing the waste gaseous products through delivery-pipes and valves such as are shown in the drawings and hereinbefore described (and through the washing apparatus, if employed) for extinguishing fire without the aid of any blower other than that which produces the forced draft. I do not, however, in any case confine myself to the particular kinds of valves shown and described, it being obvious that changes may be made in this respect without affecting the action of the apparatus.

What I claim is—

1. For extinguishing fires by waste products of combustion, the combination, with the smoke-box of a steam-boiler furnace, of a branch outlet-pipe therefrom, a valve for controlling the passage through said pipe, an air-conduit, a valve for controlling the passage of air therethrough, and a steam-jet blower adapted to withdraw products of combustion from said smoke-box through said branch outlet-pipe and to draw air through said air-conduit, substantially as herein described, for the purposes specified.

2. For extinguishing fire by waste products of combustion, the combination, with the smoke-box of a steam-boiler furnace, and a steam-boiler heated by said furnace, of a branch outlet-pipe 4 therefrom, a washing-chamber 5, a valve adapted to place said chamber in communication with said smoke-box, an air-inlet pipe by which said chamber may be placed in communication with the atmosphere, a water-distributer located within the upper part of said chamber, a steam-jet blower in communication with the upper part of said chamber, and a pipe 12, with valve for supplying steam from said boiler to said steam-jet blower.

3. For extinguishing fire by waste products of combustion, the combination, with the smoke-box of a steam-boiler furnace and a steam-boiler heated by said furnace, of a branch outlet-pipe 4 from said smoke-box, a valve for controlling the passage therethrough, a washing-chamber 5, an air-inlet by which said chamber may be placed in communication with the atmosphere, a steam-jet blower 11 in communication with the upper part of said chamber, a receiver 14, in communication with said steam-jet blower and provided with one or more outlets, and a pipe or pipes in communication with said receiver, substantially as herein described, and for the purposes specified.

4. For extinguishing fire by the waste products of combustion, the combination, with the smoke-box of a steam-boiler furnace, of a branch outlet-pipe therefrom, a blower adapted to withdraw waste products from said smoke-box and force the same to the place where they are to be utilized, two washing-chambers through which said waste products are caused to pass by the action of said blower, a valve for controlling the communication between the first of said washing-chambers and said smoke-box, water-distributers located within said washing-chambers, and trapped outlets for withdrawing water from said washing-chambers, said blower being arranged to draw the products through the first washing-chamber and discharge them into the second washing-chamber, substantially as herein described, for the purpose specified.

In testimony whereof I have signed my name to this specification in the presence of two subscribing witnesses

HENRY CLIFTON CARVER.

Witnesses:
  ALBERT COATES,
  JAS. H. WELLARDY,
    *Both of 3 Cross Street, Manchester.*